July 5, 1938.  E. R. GLENZINSKI  2,122,938
HYDRAULIC TRANSMISSION MECHANISM
Filed June 15, 1936   5 Sheets-Sheet 1
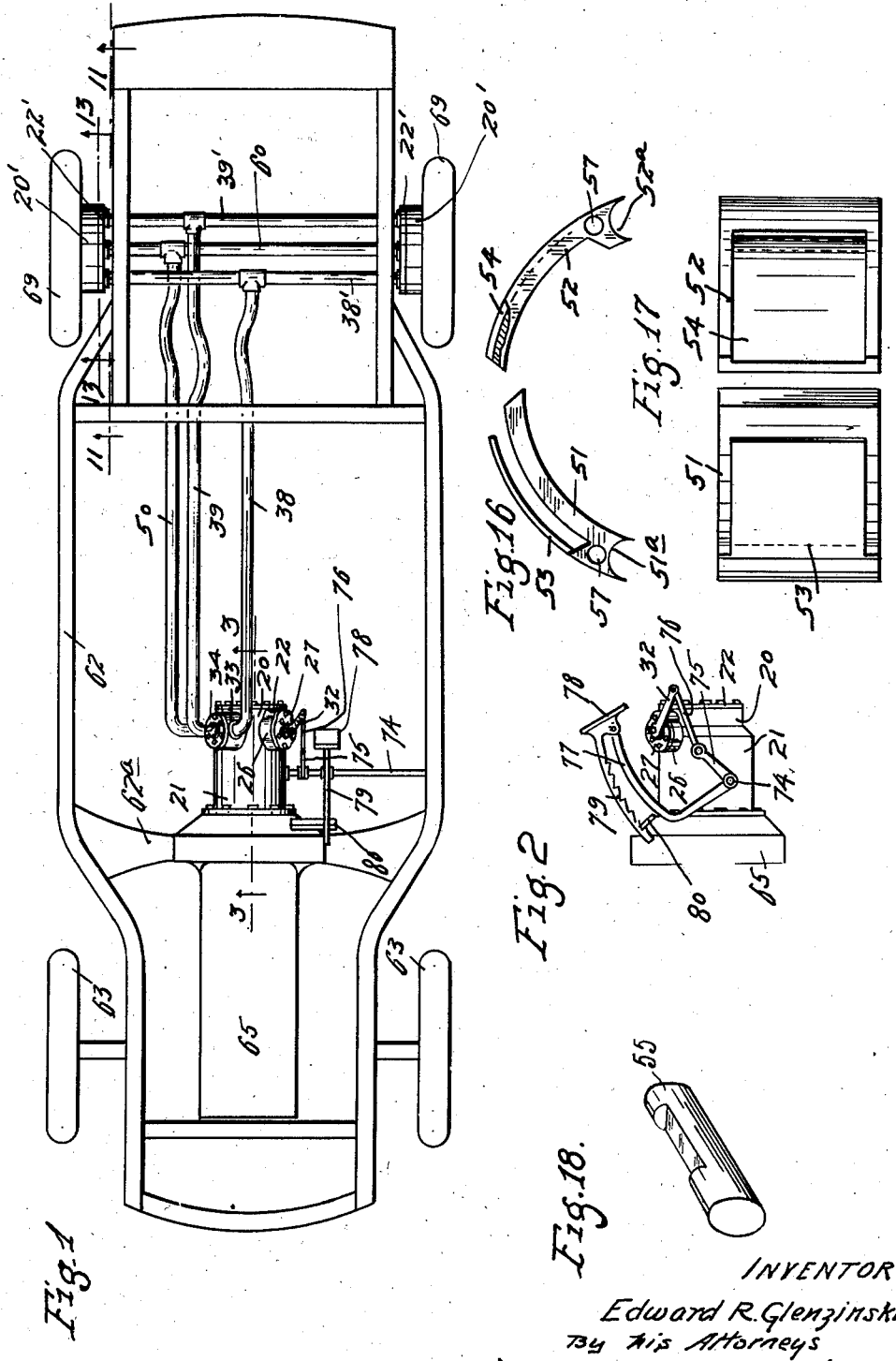
INVENTOR
Edward R. Glenzinski
By his Attorneys
Merchant & Kilson

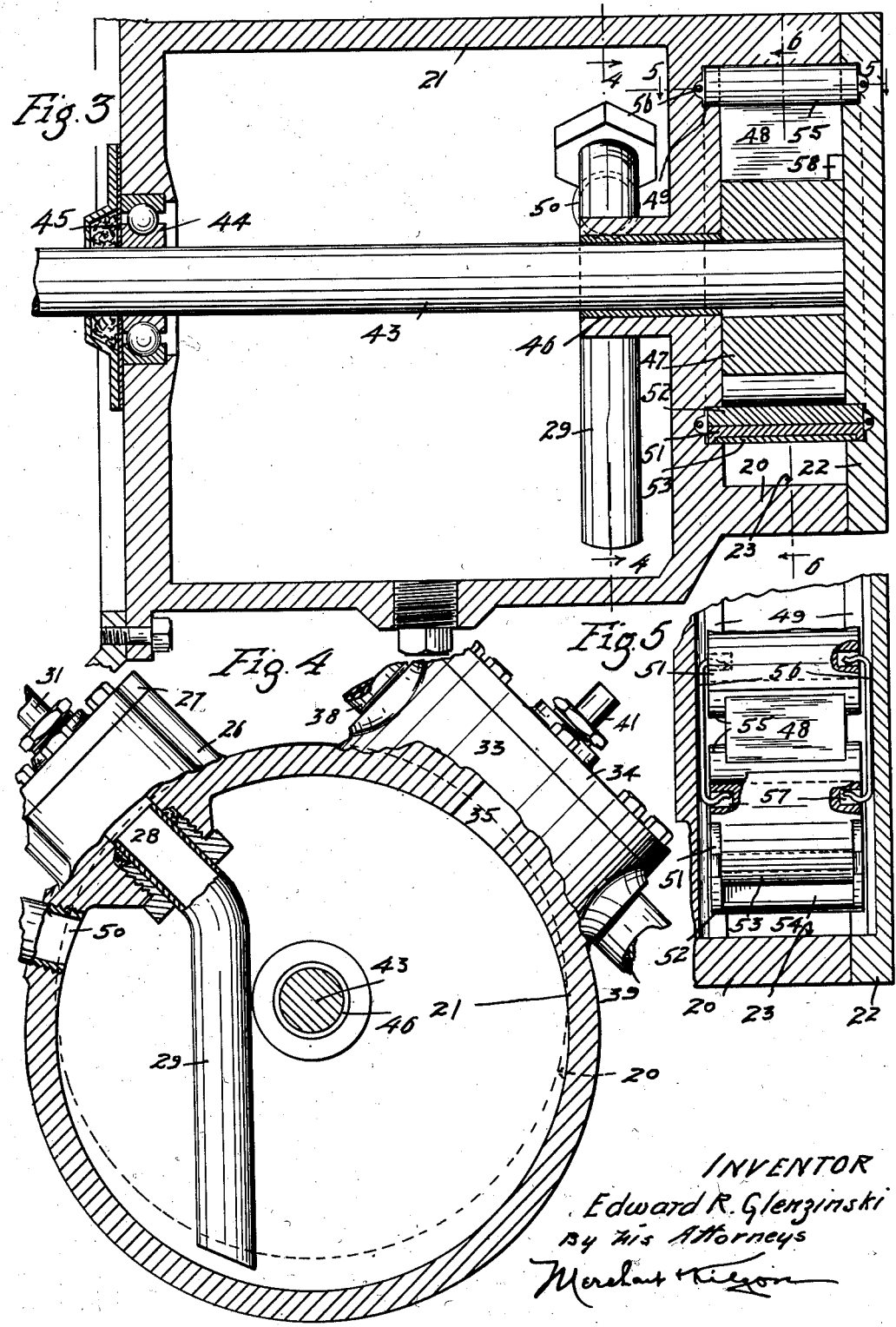

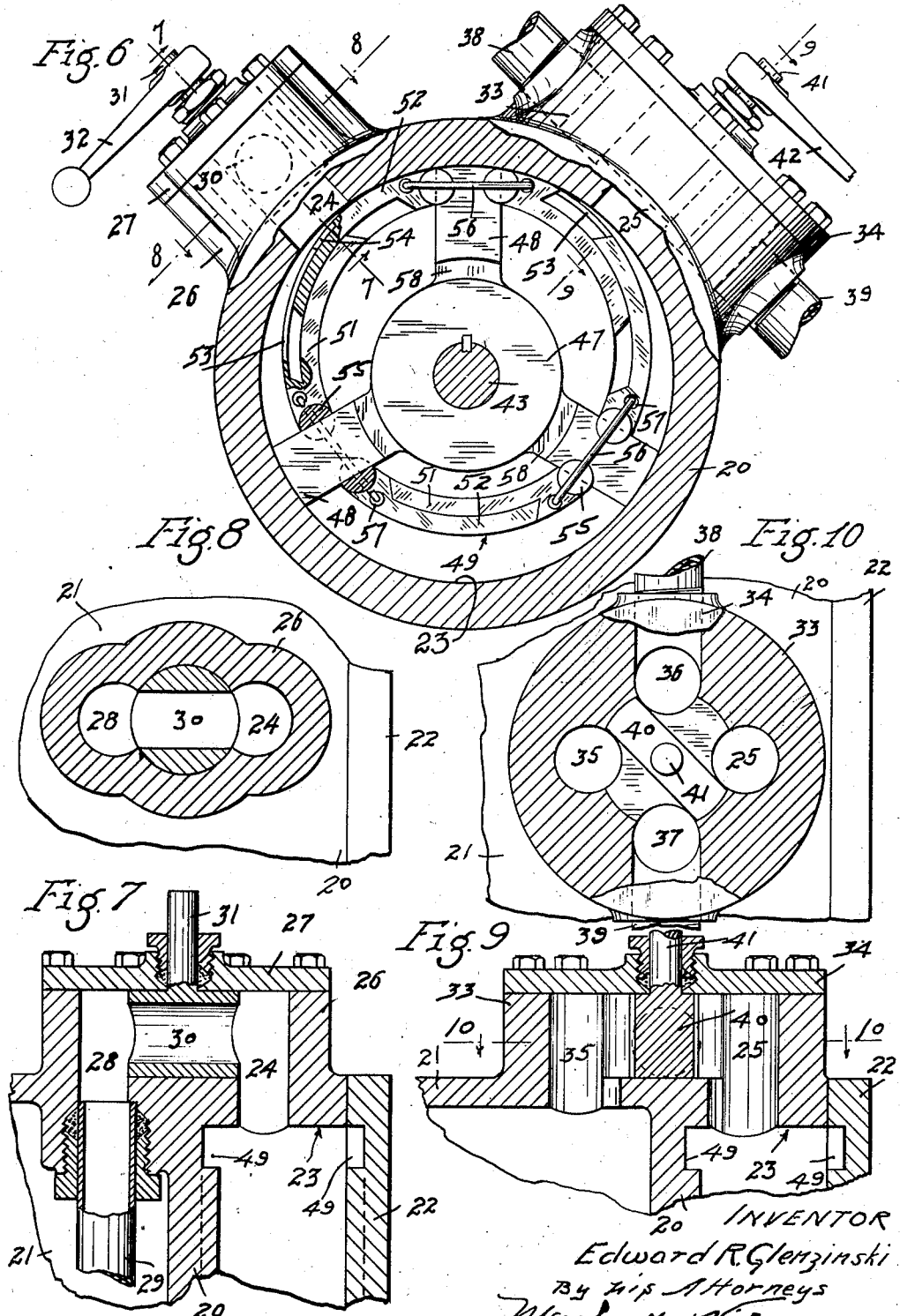

July 5, 1938.  E. R. GLENZINSKI  2,122,938
HYDRAULIC TRANSMISSION MECHANISM
Filed June 15, 1936   5 Sheets-Sheet 4
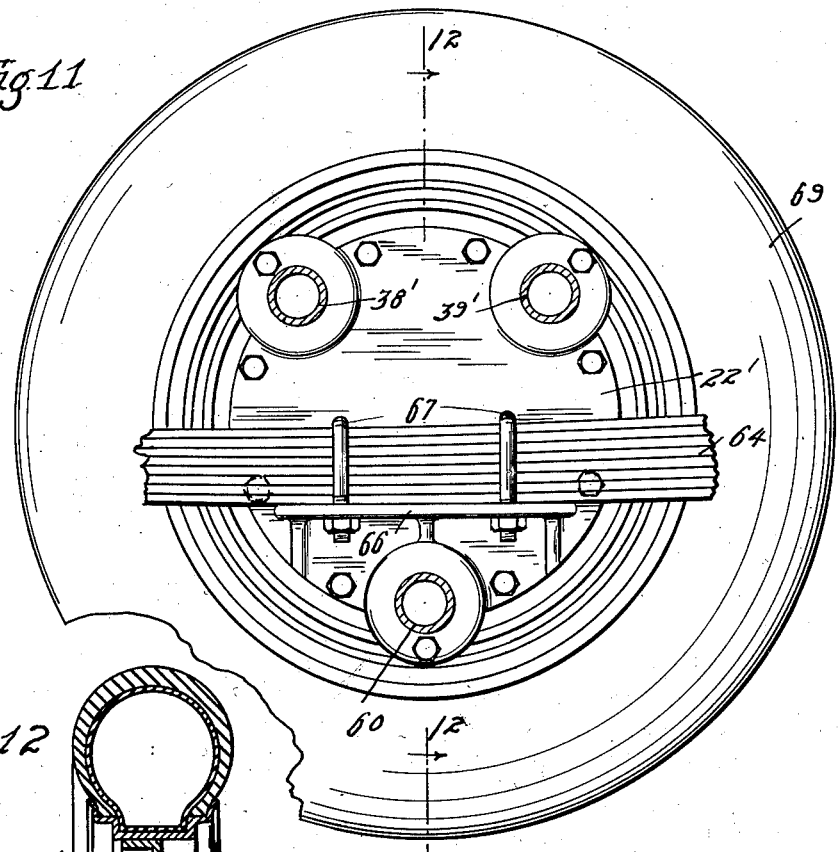
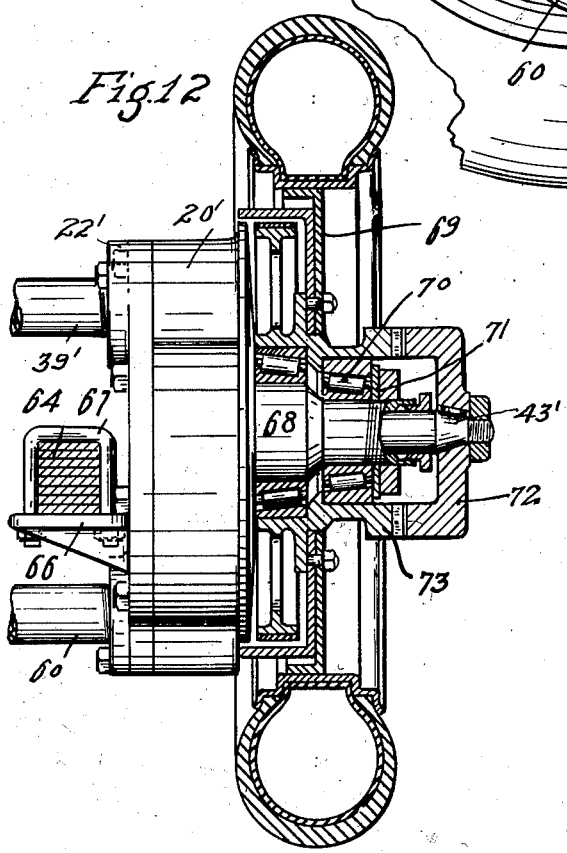
INVENTOR
Edward R. Glenzinski
By his Attorneys July 5, 1938.  E. R. GLENZINSKI  2,122,938
HYDRAULIC TRANSMISSION MECHANISM
Filed June 15, 1936  5 Sheets-Sheet 5

INVENTOR
Edward R. Glenzinski
By his Attorneys
Merchant & Kirson

Patented July 5, 1938

2,122,938

UNITED STATES PATENT OFFICE 2,122,938

HYDRAULIC TRANSMISSION MECHANISM

Edward R. Glenzinski, Winona, Minn., assignor of one-half to Sylvester D. J. Bruski, Winona, Minn.

Application June 15, 1936, Serial No. 85,273

6 Claims. (Cl. 121—88)

My invention primarily has for its object the provision of an improved hydraulic transmission system or mechanism; but also provides an improved rotary motor per se. Rotary motor is here used in a broad sense to include a motor in which the rotor is propelled by mechanical means, such as an engine, in which case the motor will act as a pump, and also an arrangement wherein the rotor is hydraulically propelled by the delivery of fluid thereto under pressure. In application of the invention of the complete transmission system, one of these hydraulic rotary motors will be engine-driven, so that the motor then will act as a hydraulic pump; and one or more motors will be hydraulically driven by fluid delivered thereto from the pump-acting master motor.

As a further and important feature the invention involves an arrangement of fluid-delivery conduits and control devices between the motors, whereby, under constant direction of rotation of the rotor of the master motor, the hydraulically propelled motor or motors may be made reversible, that is, rotated in either direction.

Preferably, the master motor and the hydraulic motor or motors will involve similar novel features of construction. Such motors may be utilized for numerous different purposes. For example, they may be power-driven and used as pumps, or, they may be driven by water or fluid under pressure from any source and used as motors for converting fluid pressure into rotary motion.

The complete invention involves important novel features that especially adapt the invention for driving the wheels, either two or more, of an automobile or motor-propelled road vehicle; in which application the master motor will be driven from the vehicle engine and the several secondary or minor motors will be driven by fluid circulated from the pump-acting master motor. The application of the invention for driving a motorboat or an aeroplane or the like, will usually require but the master motor and one driven motor, but even in such applications there can be as many fluid-driven motors as there are propellers or the like to be driven.

Various other applications of the invention or the motors thereof will be found and will naturally suggest themselves, and hence, no attempt will here be made to enumerate all the possible uses thereof.

With the above general statements made, the invention will be described in connection with the appended drawings which illustrate the improved transmission system applied to an automobile or motor-propelled vehicle to drive the two rear traction wheels. Here it may be stated that in this application of the invention or other similar applications, the customary differential gears are eliminated and made unnecessary, thereby giving increased road clearance and permitting the body of the vehicle to be set closer to the ground than where differential gears are used.

Referring to the drawings, wherein like characters indicate like parts throughout the several views, Fig. 1 is a somewhat diagrammatic view in plan showing the chassis of an ordinary automobile having the improved hydraulic transmission mechanism or system applied thereto;

Fig. 2 is a fragmentary view showing a foot-actuated treadle with connections for operating the throttle or choke valve controlling the speed of the master motor;

Fig. 3 is an axial section taken through the master motor and associated with an oil reservoir on the line 3—3 of Fig. 1;

Fig. 4 is a transverse section taken on the line 4—4 of Fig. 3, some parts being shown in full;

Fig. 5 is a fragmentary section taken on the line 5—5 of Fig. 3;

Fig. 6 is a transverse section taken on the line 6—6 of Fig. 3, some parts being shown in full;

Fig. 7 is a fragmentary section taken on the line 7—7 of Fig. 6;

Fig. 8 is a section taken on the line 8—8 of Fig. 6, some parts being broken away;

Fig. 9 is a fragmentary section taken on the line 9—9 of Fig. 6;

Fig. 10 is a section taken on the line 10—10 of Fig. 9;

Fig. 11 is a fragmentary section taken on the line 11—11 of Fig. 1, some parts being broken away;

Fig. 12 is a vertical section taken on the line 12—12 of Fig. 11, some parts being broken away;

Fig. 16 is a side elevation showing two interlapping joint strips pulled apart or separated;

Fig. 17 is a plan view of the parts shown in Fig. 16; and Fig. 18 is a perspective showing one of the rocker-acting joint strips.

Figure 13:
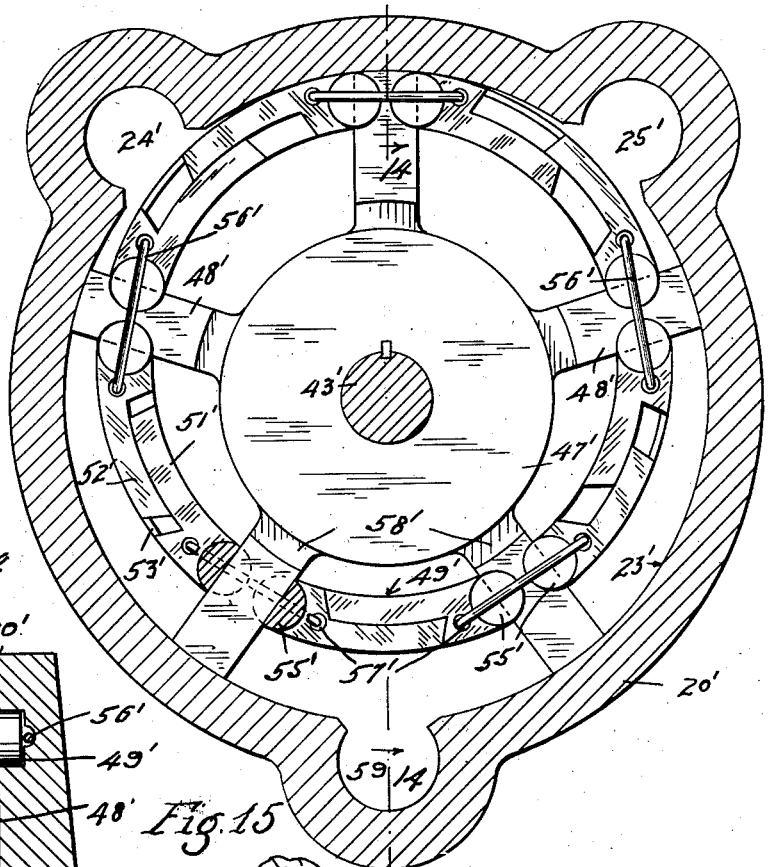
Fig. 13 is a section taken through one of the hydraulically-driven secondary motors, approximately on the line 13—13 of Fig. 1.

I will first describe the engine-driven pump-acting master motor, a preferred construction of which is here illustrated and is best shown in Figs. 3 to 9, inclusive, of the drawings. The main body of the motor casing 20, as shown, and preferably, is cast integral with an oil reservoir 21 and is provided with a removable side plate 22. The interior of the shell 20 is formed with an internal cylindrical surface 23. Intake port 24 opens through the casing or shell 20 and a discharge port 25 leads outward through the shell 20, the said ports, as shown, being located about 90° apart. Port 24 leads into the cavity of a large boss 26 which, as shown, is provided with a detachable side plate 27. The boss 26 is provided with a port 28 that is connected to the delivery end of an oil intake tube 29, which latter preferably extends nearly to the bottom of the reservoir 21. Rotatively mounted between the ports 28 and 24 is a throttle-acting choke valve 30, the stem 31 of which projects through plate 27 and is shown as provided with a projecting arm 32.

Discharge port 25 leads to the recessed interior of a large boss 33 formed on the shell 20 and, as shown, provided with a detachable cover plate 34. The recessed interior of boss 33 has a port 35 that leads back into the reservoir 21.

Inasmuch as the master motor here illustrated is especially designed for reversibly driving one or more secondary rotary hydraulic motors, the boss 33 is shown as provided with diametrically opposite ports 36 and 37 that communicate with the cavity of the boss 33 at diametrically opposite points midway between the ports 25 and 35. Port 36 leads to a pipe 38 and port 37 leads to a pipe 39.

Working in the cavity of the boss 33 is a rotary reversing valve 40, the stem 41 of which extends through the plate 34 and is shown as provided with an operating arm 42. The use and operation of the valve 40 will be described later on.

The rotor of this master motor will be driven directly or indirectly from an engine or primary source of power which, in the application of the invention to a motor-propelled vehicle, will be the engine thereof.

In the drawings, see particularly Figs. 3 and 6, the numeral 43 indicates the engine crank-shaft or a shaft driven therefrom. This shaft, as shown, is extended through the oil reservoir 21 and is mounted at one end of the reservoir in anti-friction bearing 44 and extends through a packing gland 45. Said shaft is extended through the other wall of the reservoir and which wall is the inner wall of the shell or casing of the master motor and, as shown, is extended through a long journal bearing 46. The axis of the shaft 43 is concentric to the axis of the cylindrical surface 23. The rotor of this master motor is keyed or otherwise rigidly secured to the shaft 43 and, as shown, comprises a hub 47 having three radially projecting propeller blades 48, the outer edges of which run in close but preferably not quite frictional contact with the cylindrical surface 23.

The cylindrical surface of the rotor is of a novel and peculiar construction and arrangement. It is made up chiefly of circumferentially expansible and contractible segments that are arranged to run in annular grooves or runways 49 formed in the fixed and movable walls of the casing 20—22. These runways 49 are eccentric to the cylindrical surface 23 and to the axis of the shaft 43. Here it is further important to note that the outer surfaces of these runways 49, at points midway between the ports 24 and 25, are tangential to the cylindrical surface 23, but at diametrically opposite points are very considerably radially distant from said cylindrical surface.

A pipe 50 which, in the complete arrangement hereinafter more fully described, leads back into the reservoir 21, see particularly Figs. 1 and 4.

The rotor of this master motor, in addition to the hub 47 and its blades 48, comprises a cylindrical shell or drum made up of circumferentially expansible and contractible joint segments that are wider than the blades 48 and whose edges are arranged to travel in the runways or grooves 49. Each of these so-called circumferentially expansible and contractible joint or drum segments, in the preferred form of this novel structure, involve two lapped segments 51 and 52, see particularly Figs. 3, 6, 16 and 17. The bodies of the sections 51 lap into the reduced portions of the sections 52. The sections 51 have segmental lap flanges 53 that work in grooves 54 formed in the sections 52. The extended ends of the sections 51 and 52 are formed with semi-cylindrical seats 51a and 52a in which work the semi-cylindrical bodies of end joint strips 55. The flat surfaces of the strips 55 work slidably against the faces of the propelling blades 48 and are yieldingly pressed into such engagement by spring-acting links 56, the ends of which are shown as seated in recesses 57 formed in the said sections 51 and 52. The ends of the rocker-acting joint strips 55 project beyond the joint segments and travel in the guideways 49.

It will now be seen that the segmental joint strips or members 51 and 52, together with the blades 48, form a complete closed circular structure and that the joint segments or sections travel a course that is eccentric to the axis of the rotor and to the axis of the cylindrical surface 23 so that under rotation of the rotor, the blades 48 will move radially between the flat surfaces of the rocker-acting strips 55 and the latter will maintain oil-tight joints with the said blades. Also it is evident that as the joint strips move closer to the axis of the rotor the sections 51 and 52 will move into closer overlapping engagement, as shown at the bottom of Fig. 6, while as they move to or from the upper portion of the cylindrical surface 23, the said sections 51 and 52 will be pulled farther apart, but at all times, will maintain sealed joints between the cylindrical surface 23 and the exterior of the rotor drum made up chiefly of the said sections 51 and 52.

To permit a free flow of the oil or other fluid from one side to the other of the blades 48 in the spaces within the travelling drum or shell of the rotor, said blades are shown as provided with passages 58.

The rotor will be assumed to be rotated in a counter-clockwise direction, in respect to Fig. 6. Under this direction of rotation the oil or other fluid being pumped will be drawn in through the intake port 24 and will be discharged through the outlet port 25. The amount of oil that is being pumped may be regulated by adjustments of the throttle-acting choke valve 30. For the present it is sufficient to state that with the structure so far described, the oil will be drawn from the oil reservoir and always discharged through the port 25 regardless of the adjustment of the valve 40, at this point see particularly Fig. 10.

Figure 14:
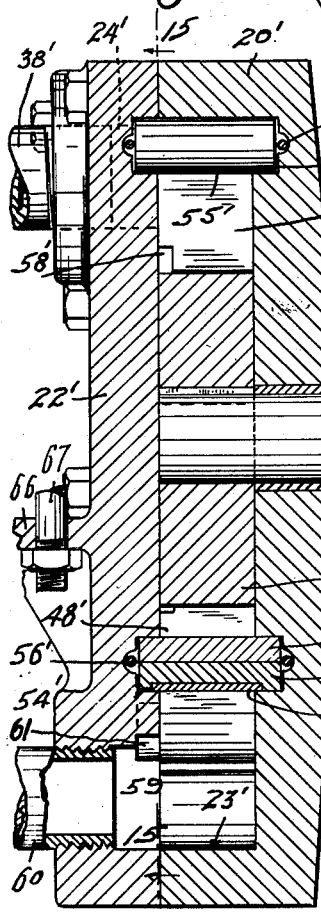
Fig. 14 is a section taken approximately on the line 14—14 of Fig. 13, some parts being broken away.
Figure 15:
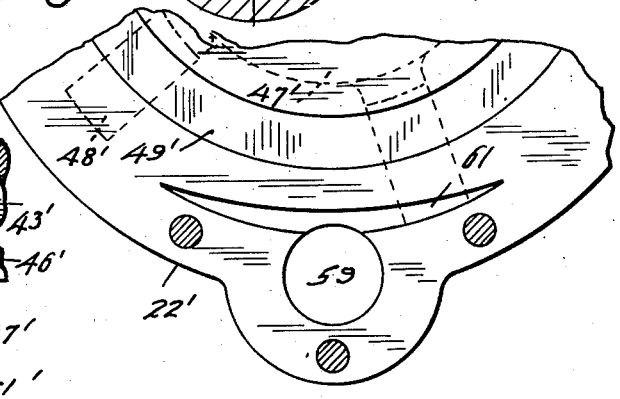
Fig. 15 is a fragmentary view showing a lower part of one of the plates of the casing of the motor illustrated in Figs. 13 and 14, with parts separated on the line 15—15 of Fig. 14 and with some upper parts removed.

The secondary or fluid-driving hydraulic pump or pumps are each very much of the same structure as the master pump, above described, see particularly Figs. 13, 14 and 15, and hence, corresponding parts are indicated by the same numerals that are used in the description of the master pump, with the prime added to said numerals.

The main body 20' is detachably but rigidly bolted or otherwise secured to a side plate 22' and is formed with a cylindrical inner surface 23'. Near its upper portion the casing 20' is formed with circumferentially spaced ports 24' and 25'. The ports 24' and 25', respectively, are connected to pipes 38' and 39' that lead from connections presently to be described. Near its bottom or midway between the ports 24' and 25' the casing 20' is provided with an intermediate port 59 that is connected to a pipe 60, see Figs. 1, 11, 12 and 14. The rotor of this secondary motor comprises a hub 47' having, in the preferred arrangement illustrated, five projecting propeller blades 48' that are notched at their inner portions to afford passages 58'. The hub 47' is secured to a short shaft 43' that is journaled in and projects through the hub of the shell 20'. Except for the number thereof, the circumferentially expansible and contractible joint segments that make up the shell or drum of the rotor are of the same structure as those illustrated and described in connection with the master motor, and hence, the corresponding parts are here marked with the characters 51', 52', 55', 53', and 56'. The projecting cylindrical ends of the rocker-acting joint strips 55' and the edges of the sections 51' and 52' here work in circular guideways or grooves 49' formed in the case sections 20' and 22'. For a purpose which will presently appear, the head plate 22', in its lower portion, is formed with an oil escape channel 61 that is in communication with the port 59.

With the motor just described, it is evident that if oil or other fluid under pressure be forced into the casing through the port 24', the rotor of the motor, see Fig. 13, will be rotated in a counter-clockwise direction. As the blades 48' pass the port 59, the oil then under pressure will be permitted to escape through the port 59; but oil not discharged through port 59 will be carried on and discharged through port 25'.

The operation of the master motor and of the one or more secondary motors, insofar as they are individually concerned, is thought to have been made clear, and I will now describe these motors as applied to an automobile or motor-propelled vehicle to drive the rear traction wheels thereof.

In Fig. 1 the numeral 62 indicates the chassis frame of an automobile or motor-propelled vehicle, which frame, at its front end, is assumed to be spring-supported in the customary way from front steering wheels 63. The rear portion of the frame 62 may be assumed to be supported on springs 64, see Figs. 11 and 12, in the conventional or any other suitable way.

In this application of the invention, the oil reservoir 21, which directly supports the master motor, is bolted or otherwise rigidly secured to the rear end of the engine frame 65, which latter is rigidly secured to a cross beam 62a and other parts of the chassis frame 62. In this arrangement the shaft 43 of the master motor will be aligned with the crank-shaft of the engine 65 and will be either an extension of said crank-shaft or will be secured for rotation therewith. The engine 65 will usually be the customary internal combustion engine, but may be a prime mover of any suitable type as far as this invention is concerned.

For individually driving the rear wheels there is, of course, a secondary or fluid pressure-driven hydraulic motor for each such wheel, and in this arrangement the side plates 22' are shown as provided with strong laterally projecting brackets 66 rigidly secured to the intermediate portions of the springs 64 by nut-equipped U-bolts 67 or other suitable means. At this point it may be now noted that the pipe 38', which communicates with pipe 38, is, at its ends, connected to the ports 24' of the two secondary motors; that the pipe 39', which communicates with pipe 39, is, at its ends, connected to the ports 25' of both secondary motors; and that the pipe 60, which communicates with pipe 50, is, at its ends, connected to the ports 59 of both secondary or fluid-driven motors. It may here also be stated that the pipes or tubes 38, 39, 50, 38', 39' and 60 may be of flexible or yielding construction if desired or found necessary in any particular instance.

In Figs. 11 and 12 the means for driving the rear traction wheels from the rotors of the secondary or pressure-driven hydraulic motors is particularly illustrated. By reference particularly to Figs. 12 and 14, it will be noted that the case-forming sections 20' are provided with heavy and strong axially projecting gudgeons or non-rotary hubs 68 on which the rear wheels 69 are journaled by means of ball-bearings 70 or other suitable devices. Also the wheels are held against lateral displacement on the hubs 68 by the usual or any other suitable means, such as nut-held washers 71. The motor shafts 43' are journaled in bushing 46' of 20' and in the hubs 68 through which they project and are provided with clutch-acting caps 72 keyed or otherwise rigidly secured thereto for rotation therewith. These caps 72, of the structure illustrated, have notched flanges that interlock with the hubs 73 of the respective wheels 69 so that said wheels will be independently driven by the respective secondary motors.

In this application of the invention for driving the traction wheels of a motor-propelled vehicle, it is desirable to provide a foot-actuated treadle or lever for readily adjusting and setting the throttle-acting choke valve 30 of the master motor structure; hence, as shown in Fig. 2, I have, as shown, provided a rock-shaft 74 to which is secured an arm 75 connected by a link 76 to the valve arm 32. Rock-shaft 74 is shown as journaled in a bearing on the oil reservoir 21 and on the frame 62 and is provided with a long arm 77 to which a foot-piece 78 is pivoted. This foot-piece 78 is provided with a ratchet-toothed arm 79 which, by rocking movement of the foot-piece 78, is readily engageable with and disengageable from a detent or lug 80 on the base of the reservoir 21.

*General operation*

In a general way the operation of the master motor and the secondary motors individually have been described; and I will now describe the operation of the motors applied to an automobile or motor-propelled vehicle in the manner illustrated in the drawings.

The valves 30 and 40, see particularly Figs. 7—8, and 9—10, will be assumed to be set as shown in said views. Then, when the rotor of the master motor is, by the power of the engine, rotated in the counter-clockwise direction, heretofore stated, oil will be drawn from the bottom of the reservoir through the pipe 29, port 28, passage of valve 30, and port 24, and will be forced out through the discharge port 25. From discharge port 25 the oil will be forced through port 36, pipes 38 and 38' to the intake ports 24' of the two wheel-driving secondary motors. Pressure of the oil forced against the propeller 48', that has just passed the port 24', will cause the rotors of the wheel-driving motors to rotate in the direction to produce forward movement of the vehicle. The pressure of the oil will act upon the propeller blade 48', that has just passed said port, until the next following propeller blade passes said port 24'. As the propeller blades 48' pass the intermediate port 59, the oil pressure will be released and the oil will flow out through said port to oil return pipe 60 of the two motors and from thence through pipe 50 back into the oil reservoir 21. The oil that is not discharged through said intermediate port 59 will be carried to port 25' and from thence will be returned to the reservoir 21 through pipes 39', 39, and ports 37—35.

In this arrangement the rotors of the wheel-driving secondary motors may be reversely driven without changing the direction of rotation of the rotor of the master motor simply by turning the reversing valve 40, 90° so as to set the same at one edge midway between the ports 25 and 36 and at its other edge midway between the ports 35 and 37. When the said valve 40 is thus set, the flow of oil to and from the secondary motors will be as follows: From port 25 to port 37, out through pipe 39 to pipe 39', thence to the ports 25' of the two secondary motors (which will cause the rotors of the two secondary motors to be driven in a clockwise direction), from secondary motors out through the two ports 24' to pipe 38', back through pipe 38 to port 36, from thence to port 35 to reservoir. When the rotors of the secondary motors are driven, as stated, in a clockwise direction, the wheels will be rotated in a direction to cause the machine to back up. In this reversal of the rotors of the secondary motors, the main return of the oil to the reservoir will be the same as when the motors are driven as first described in a direction to drive the machine forward, that is, the main body of the oil will be discharged through port 59, pipes 60 and 50, back into reservoir 21.

The purpose of the escape groove or passage 61, shown in Fig. 15, is to permit reduction of partial vacuum in the space between blades 48 of the secondary motors as the said blades approach the ports 59.

In practice I have found that the best results are obtained in the master or primary motor by providing the rotor thereof with three propeller blades; and providing the rotors of the secondary motors with five such propeller blades. Of course, the number of blades may vary in both instances, but it will be found that a greater number of blades are desirable on the rotors of the secondary or fluid-driven motors.

In the operation of the master motor, the propeller blades draw the oil from the intake port through a major portion of the first half of the rotation and will force the oil under pressure out through the discharge port during a major portion of the second half of the rotation. In the case of fluid pressure-driven hydraulic motors, such as described, the force of the oil under pressure on the propeller blades of the rotors, takes place during less than the first half of the complete rotation of the rotor, and hence, the importance of giving free relief to the discharge of the oil after it has exerted its power on the blades of the rotor. This relief of pressure and release of the oil by the provision of the intermediate port 59 and return therefrom is highly important.

From the foregoing description and statements made, it will be understood that not only are the novel motors here described broadly claimed, but that the combination and relative arrangement of the various motors is also broadly claimed. Also it will be understood that the preferred arrangement illustrated in the drawings is capable of a wide range of modification within the scope of the invention herein disclosed and claimed.

What I claim is:

1. In a rotary machine of the character described, a casing having a cylindrical inner surface with intake and discharge ports, a rotor concentrically mounted in said casing and having propeller blades closely following said cylindrical surface, and circumferentially expansible and contractible joint segments in circular arrangement, mounted to move in a circular path that is eccentric to said cylindrical surface and the axis of said rotor, said joint segments being wider than said propeller blades and working in circular grooves formed in the walls of said casing, and resilient coupling links located in said annular channels, spanning the respective propeller blades and connecting the joint segments that are immediately on the opposite sides of said blades.

2. In a rotary machine of the character described, a casing having a cylindrical inner surface with intake and discharge ports, a rotor concentrically mounted in said casing and having rigidly connected propeller blades closely following said cylindrical surface, and circumferentially expansible and contractible joint segments in circular arrangement, mounted to move in a circular path that is eccentric to said cylindrical surface and the axis of said rotor, said casing having a third or intermediate port and the wall of said casing having a vent conduit extended circumferentially on opposite sides of said third port, as and for the purposes set forth, the circumferential distance between said third port and said intake and discharge ports being greater than the circumferential distance between the propeller blades of said rotor, said propeller blades inward of said joint segments having vent passage extended therethrough, and said joint segments being evenly pressed against the propeller blades against which they are interposed.

3. In a rotary machine of the character described, a casing having a cylindrical inner surface with intake and discharge ports, a rotor concentrically mounted within said casing and having rigidly connected propeller blades closely following said cylindrical surface, and circumferentially expansible and contractible joint segments made up of slidably lapping sections in circular arrangement, mounted to move in a circular path that is eccentric to said cylindrical surface and yielding means holding the extended ends of the sections of said joint segments against the propeller blades between which they are interposed.

4. The structure defined in claim 3 in which the sections of said joint segments are wider than said propeller blades and work in circular grooves formed in the walls of said casing.

5. The structure defined in claim 3 in which said joint segments at the ends of the sections thereof are concave and engage convex surfaces of joint strips, the flat sides of which slidably engage the adjacent faces of the respective propeller blades.

6. The structure defined in claim 3 in which said joint segments at the ends of the sections thereof are concave and engage convex surfaces of joint strips, the flat sides of which slidably engage the adjacent faces of the respective propeller blades, said joint strips having approximately cylindrical ends that embrace the side edges of said propeller blades.

EDWARD R. GLENZINSKI.